May 10, 1960 — A. A. ANDERSON — 2,935,996
HOSE REEL
Filed May 10, 1956
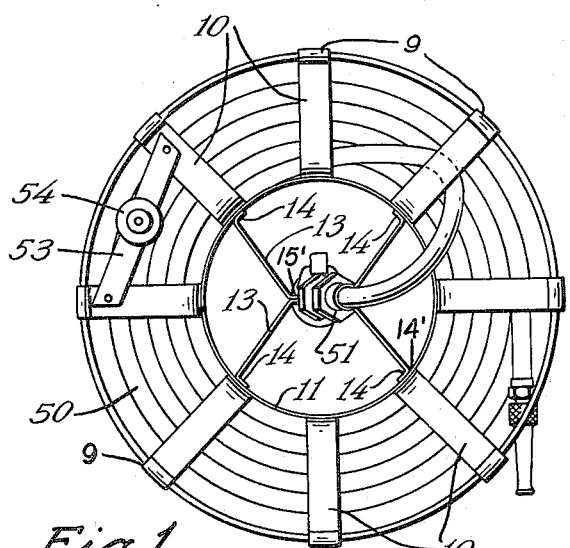
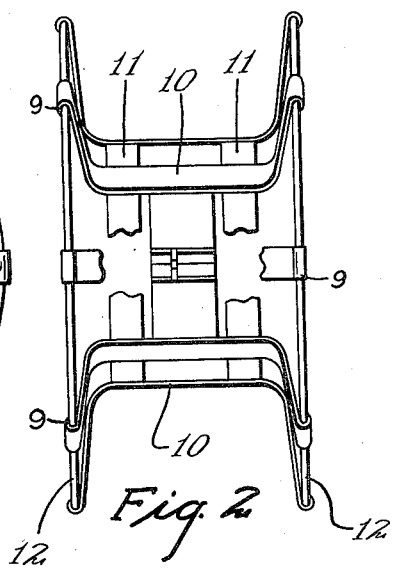
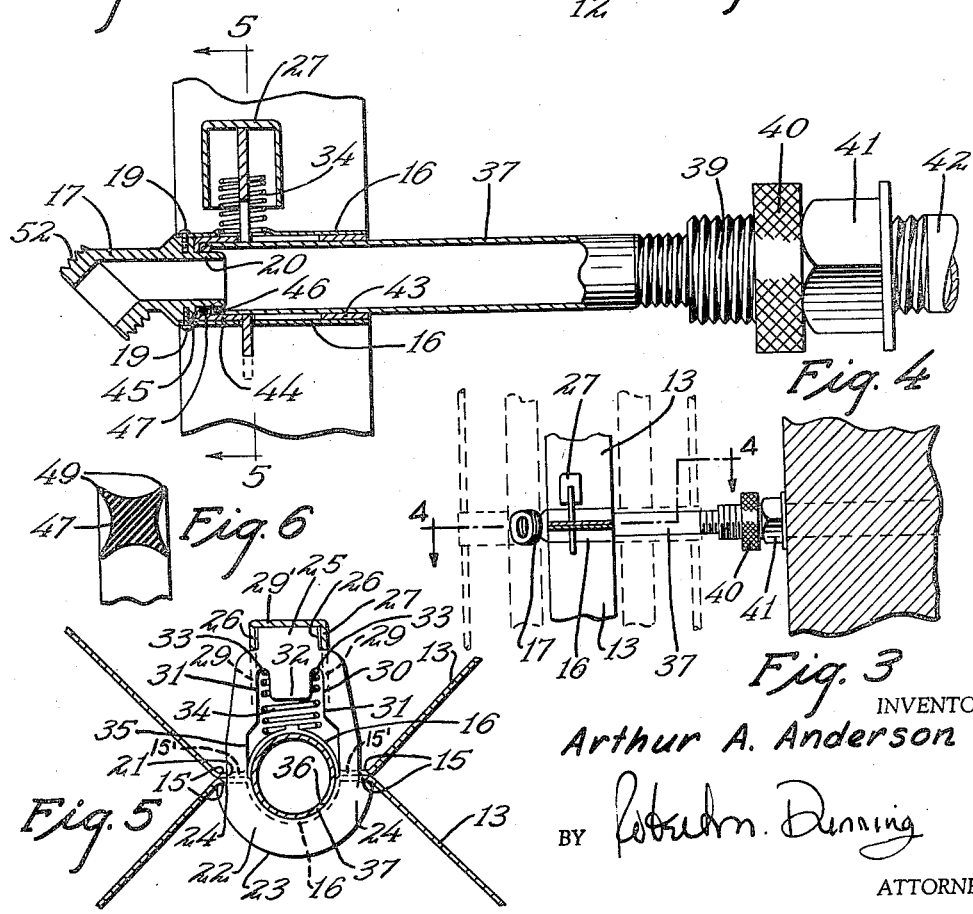
INVENTOR
Arthur A. Anderson
BY Robert M. Dunning
ATTORNEY

United States Patent Office 2,935,996
Patented May 10, 1960

2,935,996

HOSE REEL

Arthur A. Anderson, St. Paul, Minn., assignor to Specialty Manufacturing Company, St. Paul, Minn., a corporation of Minnesota Application May 10, 1956, Serial No. 584,098

5 Claims. (Cl. 137—355.26)

This invention relates to an improvement in hose reels and deals particularly with an improved device for supporting a hose.

Hose reels have been produced for a great number of years and many features of these reels are extremely old. However, one of the disadvantages which has been found in hose reels lies in the fact that they are not easily and quickly attachable and detachable. Accordingly, once the reel has been mounted in place, it usually has remained attached throughout the seasons when the hose is used. This is disadvantageous in areas where the hose may be stolen if left outside throughout these seasons. Furthermore, the provision of a detachable hose reel has the advantage that a single hose may be moved about from one place to another with a minimum of difficulty and used in various areas requiring sprinkling. An object of the present invention resides in the provision of a hose reel which includes a projecting pivot of tubular nature on which the reel is supported. A valve is provided to cut off the flow of fluid to this projecting tubular member. A quick, detachable lock is provided on the hub of the hose reel which is engageable with the projecting tubular member. The hose attaching member is mounted upon the hub of the hose reel. When the hose reel is telescoped onto the projecting tubular member, the hose connection is connected to the valve and interior of the tubular member so that when the valve is opened water will flow through the hose.

A feature of the present invention resides in the provision of a hose reel support including an open ended tubular member having a pair of spaced bearings encircling the same near the open end thereof. The hose reel is provided with a hub designed to encircle these spaced bearings for support thereupon. A hose connection is mounted upon the end of the hub and includes a tubular projection which extends into the open end of the reel support. A seal is provided for sealing the connection between this tubular projection and the tubular reel support so that fluid passing through the tubular reel support will flow through the hose connection which is usually externally threaded to accommodate the coupling on the end of the hose.

A further feature of the present invention resides in the provision of a seal of a simple and effective type. This seal is interposed between the end of the tubular reel support and an inwardly turned flange on the end of one of the hollow cylindrical bearings. This seal is preferably of a type known as a "quad ring" and is generally rectangular in section with concave surfaces between the corners so that the corners of the sealing ring provide feather edges engageable against the inner surface of the bearing member and the outer surface of the projection on the hose connection to prevent leakage at this point.

A further feature of the present invention lies in the provision of a simple and effective lock for holding the hose reel mounted upon its support. The lock comprises a flat plate of sheet metal which is slotted to accommodate the tubular support. An end of the slot is arcuate to fit snugly about the periphery of the tubular member inwardly of one of the hollow cylindrical bearings. A spring is interposed between the reel hub and the other end of the slot to normally urge the arcuate end of the slot against the tubular member. The slot is enlarged adjoining the arcuate end so that by compressing the spring, the arcuate end may be urged away from the tubular support enabling the bearing to pass through the enlarged portion of the slot upon a longitudinal pull on the reel.

A further feature of the present invention resides in combining a hose reel having supporting spokes connecting a hub and the body of the reel and a valve which operates by a rotary movement about the axis of the tubular support. Most valves employed in conjunction with hose reels include a valve stem extending in a direction normal to the axis of the reel and an operating wheel on the valve stem at a point spaced from the axis of the support. With such an arrangement the hose reel must be supported at a sufficient distance from the house or building to enable the operator to reach behind the reel to operate the faucet or valve wheel. With the present construction, the valve may be operated by extending an arm between the reel spokes and rotating the valve a short distance about the axis of the reel support. As a result the reel support may be shortened and the valve may be more easily operated.

These and other objects and novel features of my invention will be more clearly and fully set forth in the following specification and claims.

In the drawings forming a part of the specification:

Figure 1 is a front elevational view of a hose reel showing the construction thereof;

Figure 2 is a side elevational view of the hose reel, portions thereof being broken away to show the construction thereof;

Figure 3 is a side elevational view of the reel support showing the hub on the reel mounted thereon, the remainder of the reel being broken away;

Figure 4 is a side elevational view partly in longitudinal section showing the hose reel support and portions of the reel;

Figure 5 is a sectional view through the reel support and reel hub, the position of the section being indicated by the line 5—5 of Figure 4; and Figure 6 is an enlarged sectional view showing the sealing ring construction.

The reel is formed as is best illustrated in Figures 1 and 2 of the drawings. The reel includes a series of angularly spaced U-shaped members 10 which are spot welded or otherwise connected as at 9 to axially spaced supporting rings 11. The outer ends of the U-shaped members 10 are bent to enclose the marginal rings 12 of wire rod. The wire rod rings are preferably spot welded at 9 to the ends of the U-shaped members 10 to prevent any relative movement therebetween.

The spokes comprise generally U-shaped opposed members 13 which are provided with angularly turned ends 14 welded or otherwise secured as at 14' to spaced U-shaped members 10. The spoke forming members 13 are provided with surface contacting portions 15 on either side of the center thereof, these portions being spot welded together at 15'. Intermediate the connected portions 15 the U-shaped members 13 are bent to provide semi cylindrical opposed portions 16 which form a cylindrical bearing or hub for the reel.

A hose attachment fixture 17 fits into an end of the bearing formed by the semi cylindrical portions 16 of the hub and is anchored therein by machine screws 19 or by other suitable means. The hose connection 17 is provided with a hollow cylindrical projection 20 which is of substantially smaller outer diameter than the inner diameter of the hub members 16. The purpose of this projection will be later described in detail.

The hub forming members 16 and portions of the contacting areas 15 of the spoke forming members 13 are transversely slotted as indicated at 21 to accommodate a locking plate 22. The locking plate 22 has an arcuate end 23 which terminates in shoulders 24 engageable with the contacting portions 15 at the ends of the slot 21. The plate 22 extends through the slot 21 and terminates in a projecting portion 25 having generally parallel sides 26. A cup-shaped member 27 is provided with diametrically opposed longitudinal slots 29 therein which accommodate a portion of the plate 22. The cup 27 is press fitted in place or may be spot welded to the plate 22 with the closed end 29' of the cup outermost with respect to the axis of the hub.

The plate 22 is provided with an elongated aperture 30 therethrough. This aperture 30 is provided at one end with parallel sides 31. A projection 32 extends into this end of the aperture 30 to provide spaced notches 33 for accommodating the end of a spring 34 and holding the spring in position. The spring 34 is of a size to fit within the cylindrical walls of the cup-shaped member 27 for guidance thereby. This spring 34 is designed to engage against the hub forming members 16 so as to normally hold the locking plate 22 in one extreme position.

The aperture 30 is provided with an enlargement 35 which is sufficiently wide to accommodate the supporting bearings which will be later described. The end of the aperture 30 nearest the arcuate plate end 23 is arcuate as indicated at 36 to snugly accommodate the tubular support 37 on which the reel is mounted.

The tubular member 37 is threaded into one end of an externally threaded element 39 forming a part of the tubular body of a valve. This valve is of a type not illustrated in detail and includes an internal valve element which is moved longitudinally of the tubular body toward or away from its cooperable fixed valve member by an operating nut 40 threaded on the tubular member 39. The valve body also includes an internally threaded socket 41 into which extends the water supply pipe 42. By rotating the nut 40, the valve may be opened to permit water to flow from the supply pipe 42 into the hollow tubular support 37 and through this support into the hose attachment member 17.

The tubular support 37 is provided with a first hollow cylindrical bearing 43 secured to the external surface of the support 37 at a point spaced from its free end. The support also includes a second bearing member 44 encircling the end of the tubular member 37 and having an inturned flanged end 45 which is spaced outwardly from the end 46 of the tubular support 37. A sealing ring 47 is provided in the groove formed internally of the bearing member 44 between the flange 45 and the tubular member end 46.

The sealing ring may comprise a quad-ring of the type shown in section in Figure 6. It will be noted that this latter type ring is generally rectangular in cross section but the surfaces of the ring are hollowed to some extent thereby forming feather edges 49 at the corners of the structure. This type of ring provides a better seal than an O-ring, but the specific form of the ring is not claimed as novel except in the present combination. It will be noted that when it is desired to mount the hose reel onto the tubular member 37 it is only necessary to apply an inward force upon the cup-shaped member 27 compressing the spring 34 sufficiently to align the enlarged portion 35 of the aperture 30 with the bearing member 44. The hub is then slid onto the tubular member encircling the bearings 44 and 43. When fully inserted the portion of the hose attachment member 17 outwardly of the tubular projection 20 engages the end flange 45 of the bearing 44, stopping further movement. The pressure upon the button 27 may then be released and the spring 34 draws the arcuate portion 36 of the plate 22 against the similarly shaped exterior surface of the tubular member 37 inwardly of the bearing 44. Thus the bearing member 44 serves as a shoulder to prevent removal of the reel.

The hose 50 is normally provided with a coupling 51 which engages the externally threaded end 52 of the hose attachment member 17. The body of the hose is normally wound upon the reel and may be unwound therefrom by merely pulling upon the hose. A handle supporting strap 53 connects two of the U-shaped hose reel members 10 and supports a handle 54 by means of which the reel may be rotated to wind the hose upon the reel.

The water may be turned on by reaching between the spokes of the reel and rotating the nut 40 about its axis. This permits the reel support to be relatively short thereby strengthening the structure. Obviously, however, the valve may be operated by reaching around the reel if this is preferred.

In many instances a hose installation may be provided with a series of tubular supports 37, each of which is designed to accommodate the hose reel. The hose may be wound upon the reel and detached from one support and attached to another. This can be accomplished by merely pressing inwardly on the operating button 27 moving the same from the position shown in full lines in Figure 4 to the position shown in dotted outline therein and exerting a longitudinal pull upon the reel while the button is depressed. The reel and the hose may also be removed and brought into the house, the garage or storage shed during periods or seasons when it is not in use.

In accordance with the patent statutes, I have described the principles of construction and operation of my hose reel, and while I have endeavored to set forth the best embodiment thereof, I desire to have it understood that obvious changes may be made within the scope of the following claims without departing from the spirit of my invention.

I claim:

1. A hose reel including a reel body, a reel hub, means connecting said body and said hub, a hose attachment connected to one end of said hub and including a hollow cylindrical projection into said hub coaxial therewith, a tubular supporting member, a bearing on said supporting member and projecting beyond the end thereof for slidably and rotatably supporting said hub, an inturned flange on the end of said bearing, said flange forming a groove between the flange and the end of said tubular member, a sealing ring in said groove encircling said projection on said hose attachment, and means normally locking said hub from longitudinal movement on said tubular member, said locking means engaging said bearing, said locking means including an apertured plate slidably supported by said hub to extend therethrough normal to the axis of said hub, the aperture in said apertured plate encircling said tubular member.

2. The construction described in claim 1 and including resilient means for urging one end of said apertured plates against said tubular member.

3. A hose reel including a reel body, a pair of generally U-shaped members each comprising a pair of spoke portions attached to said reel body at their free ends and a bight portion extending between the other spoke ends, the bight portions of said pair of members being joined adjacent said other spoke ends and having opposed semicircular sections intermediate their joined locations thereby to form a hub, a tubular support for rotatably supporting said hub having an enlarged end, and locking means interengageable with one of said semi-circular sections and said enlarged end for normally holding said hub from longitudinal detachment from said tubular support.

4. The construction described in claim 3 in which said enlarged end constitutes a bearing for said hub.

5. The construction described in claim 3 in which the joined sections of said bights are provided with radially directed slots and said locking means comprises an apertured plate slidably disposed in said slots for engagement with said enlarged end in one position and for disengagement therefrom in another position.

References Cited in the file of this patent

UNITED STATES PATENTS

| | | |
|---|---|---|
| 1,058,538 | Boss | Apr. 8, 1913 |
| 1,403,655 | Tirrill | Jan. 17, 1922 |
| 2,476,172 | Williams | July 12, 1949 |
| 2,592,956 | Saber | Apr. 15, 1952 |
| 2,642,312 | Shine | June 16, 1953 |
| 2,752,198 | Crow | June 26, 1956 |

FOREIGN PATENTS

| | | |
|---|---|---|
| 15,848 | Great Britain | 1808 |